United States Patent
Maguire et al.

(10) Patent No.: US 10,601,006 B2
(45) Date of Patent: Mar. 24, 2020

(54) METHOD AND BATTERY ASSEMBLY FOR ELECTRIFIED VEHICLE

(71) Applicant: Ford Global Technologies, LLC, Dearborn, MI (US)

(72) Inventors: Patrick Daniel Maguire, Ann Arbor, MI (US); Manan Sevak, Southfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 68 days.

(21) Appl. No.: 15/945,999

(22) Filed: Apr. 5, 2018

(65) Prior Publication Data

US 2019/0312243 A1   Oct. 10, 2019

(51) Int. Cl.
*H01M 2/10* (2006.01)
*H01M 10/04* (2006.01)

(52) U.S. Cl.
CPC ..... *H01M 2/1077* (2013.01); *H01M 10/0481* (2013.01); *H01M 2220/20* (2013.01)

(58) Field of Classification Search
CPC ... B60K 1/00; B60K 1/04; B60K 6/20; B60K 6/28; B60R 11/02; H04B 1/3883; H01M 2/1022
See application file for complete search history.

(56) References Cited

U.S. PATENT DOCUMENTS

| | | | |
|---|---|---|---|
| 4,712,358 A * | 12/1987 | Rimmer | B26D 1/205 53/450 |
| 4,796,409 A * | 1/1989 | Rimmer | B26D 1/205 53/438 |
| 6,200,698 B1 * | 3/2001 | Carlstrom, Jr. | H01M 8/247 429/465 |
| 7,794,868 B2 | 9/2010 | Yang | |
| 2005/0170238 A1 | 8/2005 | Abu-Isa et al. | |
| 2005/0174092 A1 | 8/2005 | Dougherty et al. | |
| 2006/0166087 A1 | 7/2006 | Ogata et al. | |
| 2007/0111089 A1 * | 5/2007 | Swan | H01M 2/024 429/160 |
| 2010/0252167 A1 * | 10/2010 | Ferrari | B23K 1/0008 156/60 |
| 2011/0143179 A1 | 6/2011 | Nakamori | |
| 2011/0293985 A1 | 12/2011 | Champion et al. | |

(Continued)

FOREIGN PATENT DOCUMENTS

| | | |
|---|---|---|
| EP | 2797137 A2 | 10/2014 |
| FR | 2988915 | 3/2012 |

OTHER PUBLICATIONS

Baumeister, Joachim, et al. "Application of Aluminum Hybrid Foam Sandwiches in Battery Housings for Electric Vehicles," 8th International Conference on Porous Metals and Metallic Foams, Metfoam 2013, ScienceDirect, Published by Elsevier Ltd. Procedia Materials Science 4 (2014) pp. 317-321, Copyright 2014.

*Primary Examiner* — Scott J. Chmielecki
(74) *Attorney, Agent, or Firm* — David B. Kelley; Carlson, Gaskey & Olds, P.C.

(57) ABSTRACT

A method according to an exemplary aspect of the present disclosure includes, among other things, compressing a cell stack, which itself includes at least one battery cell and a support plate spaced-apart from an upper surface of the cell(s). The method further includes inserting the cell stack into a pocket of a structural assembly by applying a force to the support plate. A battery assembly is also disclosed.

12 Claims, 7 Drawing Sheets

(56) References Cited

U.S. PATENT DOCUMENTS

| | | |
|---|---|---|
| 2012/0045686 A1 | 2/2012 | Jung |
| 2013/0209857 A1 | 8/2013 | Lev et al. |
| 2013/0330577 A1* | 12/2013 | Kristofek ............ H01M 2/1077 |
| | | 429/50 |
| 2014/0186669 A1 | 7/2014 | Obasih et al. |
| 2014/0338995 A1 | 11/2014 | McLaughlin et al. |
| 2015/0010833 A1* | 1/2015 | Amendola .......... H01M 4/8647 |
| | | 429/406 |
| 2015/0037648 A1 | 2/2015 | Nguyen et al. |
| 2016/0093849 A1 | 3/2016 | DeKeuster et al. |
| 2016/0322664 A1* | 11/2016 | Park .................... H01M 8/2404 |
| 2016/0338760 A1* | 11/2016 | Houser ................. A61B 34/25 |
| 2016/0344061 A1* | 11/2016 | Maguire ........... H01M 10/6556 |
| 2017/0250435 A1* | 8/2017 | Katano ............... H01M 8/2457 |
| 2017/0269544 A1* | 9/2017 | Itabashi ............. G03G 21/1652 |
| 2017/0331078 A1* | 11/2017 | Schneider ........... H01M 2/0237 |
| 2017/0331141 A1* | 11/2017 | Schneider ........... H01M 10/045 |
| 2018/0156698 A1* | 6/2018 | Stern ........................ G01N 1/10 |
| 2018/0272688 A1* | 9/2018 | Sudermann ........... B41F 27/105 |
| 2019/0165408 A1* | 5/2019 | Andryukov ....... H01M 10/0468 |

\* cited by examiner

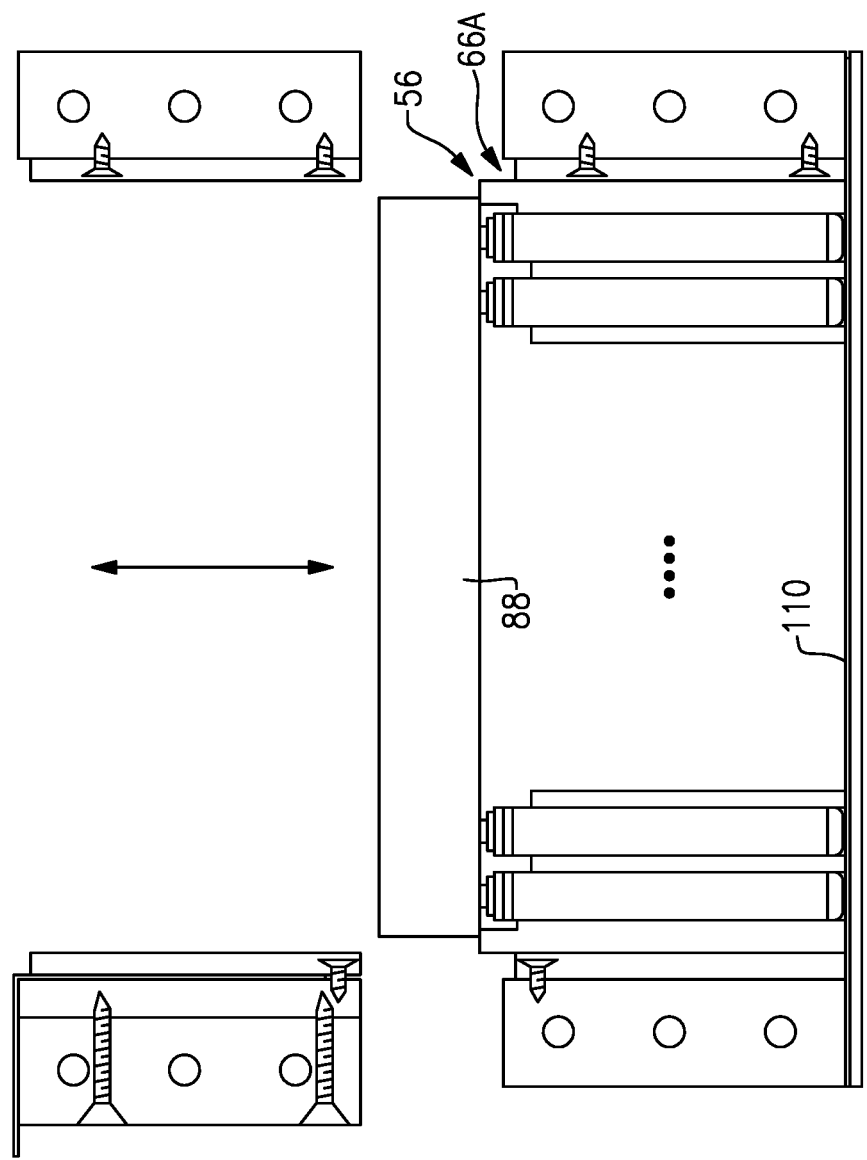

METHOD AND BATTERY ASSEMBLY FOR ELECTRIFIED VEHICLE

TECHNICAL FIELD

This disclosure relates to a method and a battery assembly for an electrified vehicle. In particular, this disclosure relates to a method in which a cell stack is compressed and inserted into a pocket of a structural assembly.

BACKGROUND

The need to reduce automotive fuel consumption and emissions is well known. Therefore, vehicles are being developed that either reduce or completely eliminate reliance on internal combustion engines. Electrified vehicles are one type of vehicle being developed for this purpose. In general, electrified vehicles differ from conventional motor vehicles because they are selectively driven by one or more battery powered electric machines. Conventional motor vehicles, by contrast, rely exclusively on the internal combustion engine to propel the vehicle.

High voltage battery assemblies are employed to power the electric machines of electrified vehicles. The battery assemblies include cell stacks constructed of a plurality of battery cells. An array structure binds the battery cells of each cell stack. A separate enclosure assembly houses and seals the battery cells from the exterior environment.

SUMMARY

A method according to an exemplary aspect of the present disclosure includes, among other things, compressing a cell stack. The cell stack includes at least one battery cell and a support plate spaced-apart from an upper surface of the at least one battery cell. The method further includes inserting the cell stack into a pocket of a structural assembly by applying a force to the support plate.

In a further non-limiting embodiment of the foregoing method, the inserting step includes using a plunger to apply the force to the support plate.

In a further non-limiting embodiment of any of the foregoing methods, the inserting step includes pressing the plunger against the support plate.

In a further non-limiting embodiment of any of the foregoing methods, the support plate is a first support plate, the cell stack includes a second support plate, the first and second support plates are arranged on opposite ends of the cell stack, and the inserting step includes using the plunger to apply a force to the first support plate and the second support plate.

In a further non-limiting embodiment of any of the foregoing methods, the at least one battery cell includes terminals projecting from a surface the at least one battery cell, and the inserting step includes using the plunger to apply the force to the support plate without the plunger contacting the terminals.

In a further non-limiting embodiment of any of the foregoing methods, the at least one battery cell includes two terminals spaced-apart from one another, and the plunger includes first and second arms arranged laterally outboard of the terminals, the first and second arms configured to contact the first and second support plates.

In a further non-limiting embodiment of any of the foregoing methods, the cell stack is compressed by a compression rig including a first end plate arranged adjacent a first end of the cell stack and a second end plate arranged adjacent a second end of the cell stack.

In a further non-limiting embodiment of any of the foregoing methods, the compression rig applies a compressive force on the cell stack before and during the inserting step.

In a further non-limiting embodiment of any of the foregoing methods, the compression rig includes a first friction plate between the first end plate and the first end of the cell stack, the compression rig includes a second friction plate between the second end plate and the second end of the cell stack, and the first and second friction plates increase the ease of inserting the cell stack into the pocket.

In a further non-limiting embodiment of any of the foregoing methods, the compression rig includes a force sensor configured to generate a signal indicative of the compressive force applied to the cell stack by the first and second end plates.

In a further non-limiting embodiment of any of the foregoing methods, the compression rig includes a sensor support sheet arranged between the first friction plate and the first end plate, and the sensor support sheet supports the force sensor.

In a further non-limiting embodiment of any of the foregoing methods, the cell stack includes a plurality of battery cells.

A battery assembly according to an exemplary aspect of the present disclosure includes, among other things, a plunger, a cell stack including at least one battery cell and a support plate spaced-apart from an upper surface of the at least one battery cell, and a structural assembly providing a pocket. The plunger is configured to insert the cell stack into the pocket by applying a force to the support plate.

In a further non-limiting embodiment of the foregoing battery assembly, the support plate is a first support plate, the cell stack includes a second support plate, the first and second support plates are arranged on opposite ends of the cell stack, and the plunger is configured to insert the cell stack into the pocket by applying a downward force to the first and second support plates.

In a further non-limiting embodiment of any of the foregoing battery assemblies, the assembly includes a compression rig configured to apply a compressive force to the cell stack.

In a further non-limiting embodiment of any of the foregoing battery assemblies, the plunger is configured to apply a force to the support plate in a direction substantially normal to the direction of the compressive force.

In a further non-limiting embodiment of any of the foregoing battery assemblies, the plunger is configured to apply the force to the support plate while the compressive force is applied to the cell stack by the compression rig.

In a further non-limiting embodiment of any of the foregoing battery assemblies, the plunger includes a first arm and a second arm configured to contact the support plate.

In a further non-limiting embodiment of any of the foregoing battery assemblies, the at least one battery cell includes terminals projecting from a surface of the at least one battery cell, and the plunger is configured to apply the force to the support plate without contacting the terminals.

In a further non-limiting embodiment of any of the foregoing battery assemblies, the compression rig includes a first end plate arranged adjacent a first end of the cell stack and a second end plate arranged adjacent a second end of the cell stack.

BRIEF DESCRIPTION OF THE DRAWINGS

In FIG. 4, the cell stack is within the compression rig.

In FIG. 6, the cell stack is partially within a pocket of the structural assembly.

FIG. 7 is a side view of the compression rig adjacent the structural assembly. In FIG. 7, the cell stack is within the pocket of the structural assembly.

DETAILED DESCRIPTION

This disclosure relates to a method and battery assembly for an electrified vehicle. In particular, this disclosure relates to a method in which a cell stack is compressed and inserted into a pocket of a structural assembly. A method according to an exemplary aspect of the present disclosure includes, among other things, compressing a cell stack, which itself includes at least one battery cell and a support plate spaced-apart from an upper surface of the cell(s). The method further includes inserting the cell stack into a pocket of a structural assembly by applying a force to the support plate. In this way, the cell stack is inserted into the pocket without applying a force to the battery cells. Thus, damage to the battery cells, including damage to the terminals of the battery cells, is avoided. These and other benefits will be appreciated from the below discussion.

Figure 1:
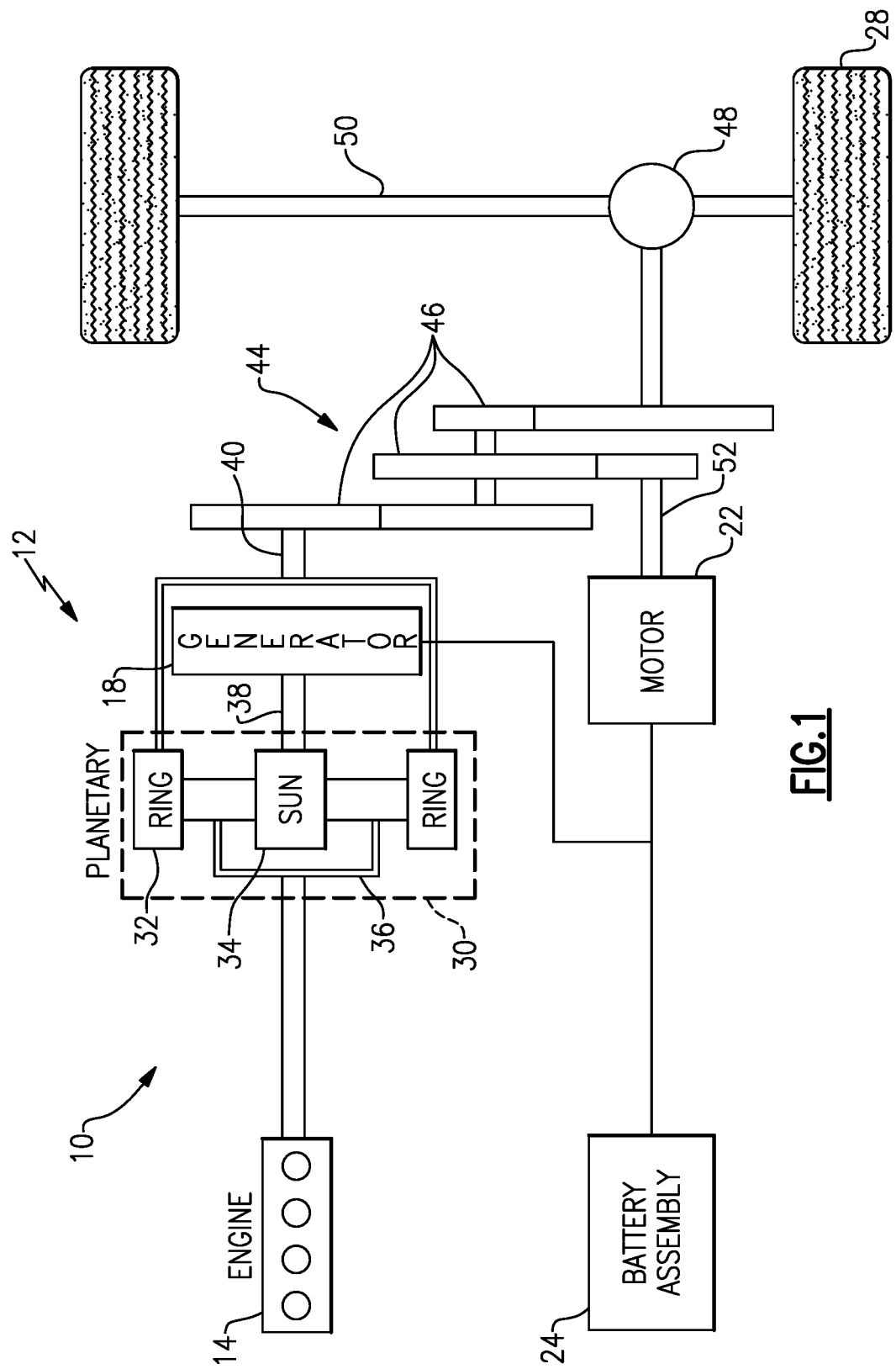
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEVs), battery electric vehicles (BEVs) and fuel cell vehicles.

In one embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery assembly 24. In this example, the second drive system is considered an electric drive system of the powertrain 10. The first and second drive systems generate torque to drive one or more sets of vehicle drive wheels 28 of the electrified vehicle 12. Although a power-split configuration is shown, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery assembly 24.

The battery assembly 24 is an exemplary electrified vehicle battery. The battery assembly 24 may include a high voltage traction battery pack that includes a plurality of battery cells capable of outputting electrical power to operate the motor 22 and the generator 18, among other components. Other types of energy storage devices and/or output devices can also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery assembly 24 state of charge up to its maximum allowable discharging rate under certain driving patterns/cycles. The EV mode is an example of a charge depleting mode of operation for the electrified vehicle 12. During EV mode, the state of charge of the battery assembly 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery assembly 24 at a constant or approximately constant level by increasing the engine 14 propulsion. The electrified vehicle 12 may be operated in other operating modes in addition to the EV and HEV modes within the scope of this disclosure.

Figure 2:
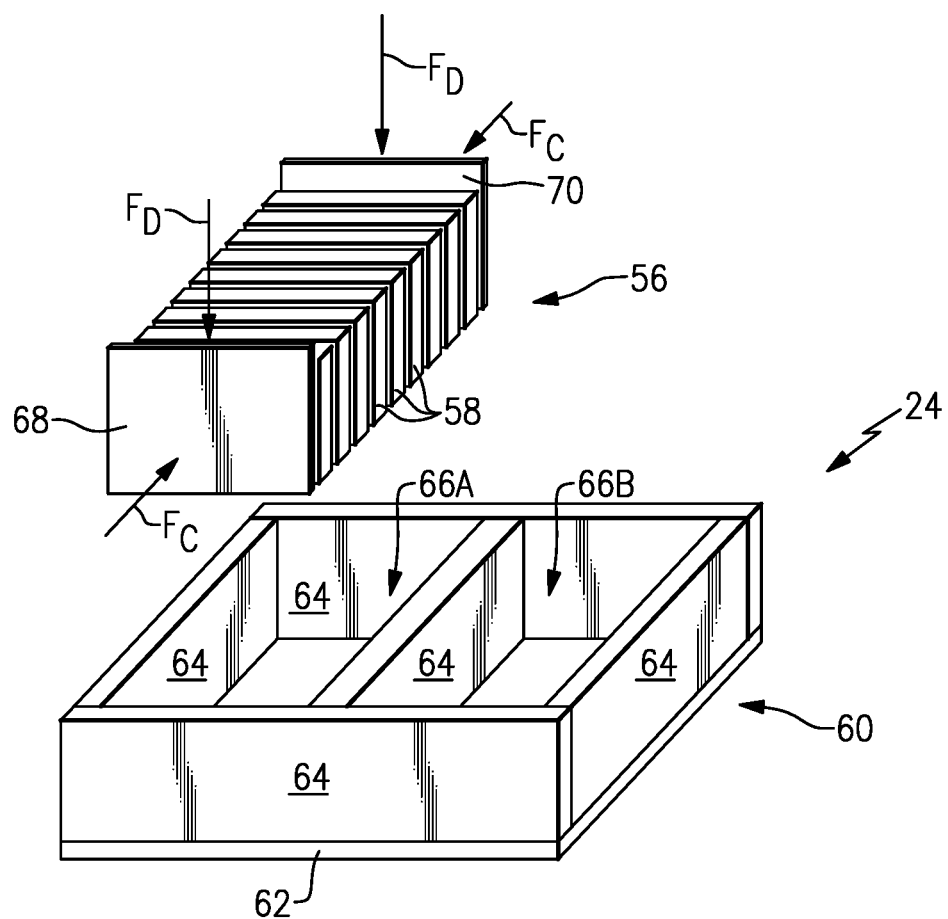
FIG. 2 is an exploded view of selected portions of a battery assembly, including a cell stack and a structural assembly.

FIG. 2 illustrates a battery assembly 24 that could be employed within an electrified vehicle. For example, the battery assembly 24 could be employed within the electrified vehicle 12 of FIG. 1. The battery assembly 24 includes at least one cell stack and a structural assembly including a pocket configured to receive the cell stack. This disclosure also uses the term "battery assembly" to refer to components used in assembling the battery assembly 24, such as the compression rig and plunger discussed below.

In FIG. 2, a cell stack 56 is shown. The cell stack 56 includes at least one battery cell, and in the illustrated example includes a plurality of battery cells (or simply, "cells") 58 for supplying electrical power to various components of the electrified vehicle 12. The battery cells 58 are stacked side-by-side relative to one another to construct the cell stack 56. Although a specific number of battery cells 58 are illustrated in the various figures of this disclosure, the battery assembly 24 could include any amount of cells. In fact, in some figures (such as FIGS. 3, 4, 6, and 7) an ellipsis is used to denote a number of cells, which could be any number of cells. The cells near the ends of the cell stack 56 are illustrated, and an ellipsis is used in place of the middle cells for ease of reference. In other words, this disclosure is not limited to the specific configuration shown in FIG. 2.

In one embodiment, the battery cells 58 are prismatic, lithium-ion cells. However, battery cells having other geometries (cylindrical, pouch, etc.) and/or chemistries (nickel-metal hydride, lead-acid, etc.) could alternatively be utilized within the scope of this disclosure.

The battery assembly 24 further includes a structural assembly 60 configured to at least partially enclose and seal the cell stack 56. In particular, the structural assembly 60 includes a base 62 and a plurality of side walls 64 arranged relative to one another to provide at least one pocket. The base 62 and side walls 64 may be connected together by welding, for example.

In FIG. 2, the base 62 and side walls 64 are arranged to provide a first pocket 66A and a second pocket 66B. While two pockets are shown, it should be understood that this disclosure extends to structural assemblies providing one or more pockets. Each of the pockets 66A, 66B is configured to receive a cell stack like the cell stack 56. To this end, this disclosure extends to battery assemblies with one or more cell stacks. While not shown in the figures, the pockets 66A, 66B can be covered by another wall, thereby substantially surrounding the cell stacks 56 from all sides.

The pockets 66A, 66B are configured to support the cell stacks 56, meaning the side walls 64 apply forces to the cell stacks 56 to hold them in position during operation of the electrified vehicle 12. The pockets 66A, 66B may also thermally separate the cell stacks 56 from one another. In addition, the structural assembly 60 may be configured to thermally manage the battery cells 58 of each cell stack 56. In one particular example, the side walls 64 are provided with cooling channels configured to direct a flow of fluid therein to thermally condition the battery cells 58. This disclosure extends to structural assemblies that do not include cooling channels, however.

In this disclosure, in order to insert the cell stacks 56 into a respective pocket 66A, 66B, the cell stacks 56 are first compressed, and, while compressed, are pressed into place in the pockets 66A, 66B. FIG. 2 schematically illustrates a compressive force $F_C$ applied to opposed ends of the cell stack 56 and along the length of the cell stack 56. The compressive force $F_C$ essentially squeezes the cell stack 56 and the battery cells 58, thereby compressing the cell stack 56 and the individual battery cells 58 to a reduced thickness.

While the compressive force $F_C$ is applied, the cell stack 56 is inserted into a respective pocket 66A by a downward force $F_D$, which is also schematically illustrated in FIG. 2.

In this example, the downward force $F_D$ is applied to first and second support plates 68, 70, which are arranged at opposite ends of the cell stack 56. The downward force $F_D$ is not applied directly to any of the battery cells 58. The first and second support plates 68, 70 need not be arranged at the ends of the cell stack 56 in all examples. Further, while two support plates are shown, this disclosure extends to cell stacks having one or more support plates. The first and second support plates 68, 70 are not battery cells, but are rather structures formed as plates and made of a plastic or a metallic material, as examples.

While the term "downward" is used herein to describe the downward force $F_D$, it should be understood that the term "downward" is used herein to refer to all forces tending to press a cell stack into a pocket. In particular, the term "downward" refers to all forces substantially perpendicular to the compressive force $F_C$, whether or not the force is truly in a "downward" direction. For example, this disclosure extends to cell stacks that are compressed and inserted into a pocket in a sideways direction.

Figure 3:
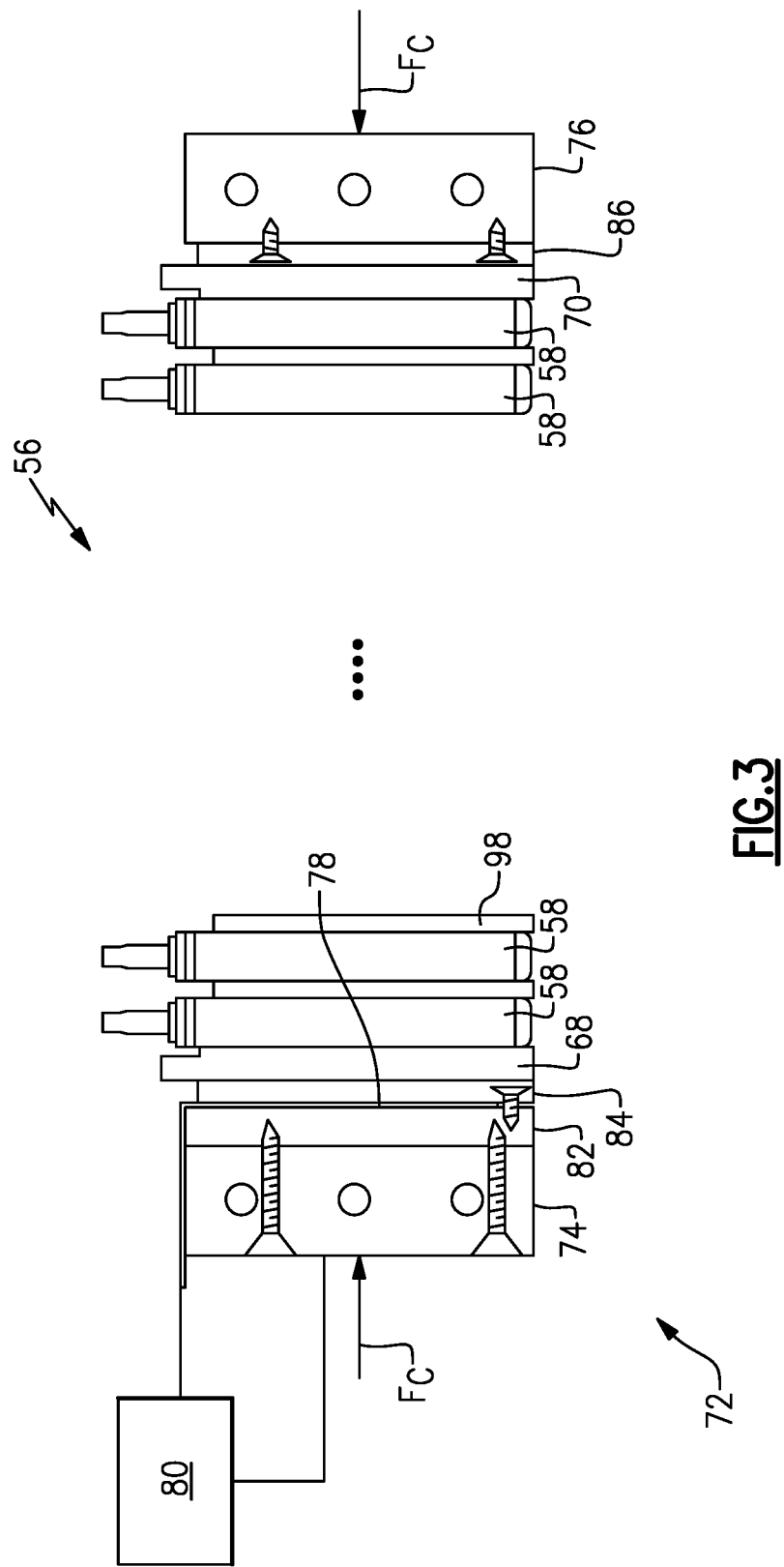
FIG. 3 is a side view of an example compression rig arranged relative to a cell stack.

FIG. 3 schematically illustrates the detail of the cell stack 56 arranged relative to a compression rig 72. The compression rig 72 is configured to apply the compressive force $F_C$ to the cell stack 56. The compression rig 72, in this example, includes first and second end plates 74, 76 arranged adjacent opposite ends of the cell stack 56. The end plates 74, 76 are part of an overall mechanism configured to urge the end plates 74, 76 together to apply the compressive force $F_C$ to the cell stack 56. In one example, one of the end plates 74, 76 is stationary, and the other of the end plates 74, 76 is configured to move relative to the stationary end plate to apply the compressive force $F_C$.

In order to determine the amount of compressive force $F_C$ applied to the cell stack 56, the compression rig 72 in one example includes a force sensor 78 arranged between the first support plate 68 and the first end plate 74. The force sensor 78 may be arranged elsewhere in the compression rig 72, however. The force sensor 78 may be any known type of force sensor configured to generate a signal indicative of a compressive force on the cell stack 56. The force sensor 78, in this example, is electrically coupled to a controller 80, which is configured to interpret the signals from the force sensor 78. The force sensor 78, in this example, is mounted to the first end plate 74 by way of a sensor support plate 82. The sensor support plate 82 is directly mounted to the first end plate 74. The force sensor 78 and the sensor support plate 82 are not required in all examples. In other examples, a displacement sensor may be used in place of a force sensor.

The controller 80 is shown schematically in FIG. 3. It should be understood that the controller 80 may be programmed with executable instructions for interfacing with and operating the various components of the electrified vehicle 12 and/or the compression rig 72, including but not limited to those shown in the figures. The controller 80 additionally includes a combination of hardware and software, and specifically includes a processing unit and non-transitory memory for executing the various control strategies and modes of the vehicle system.

In order to increase the ease with which the cell stack 56 is inserted into a respective pocket, the compression rig 72 in this example includes first and second friction plates 84, 86. The first and second friction plates 84, 86 are arranged such that they directly contact opposite ends of the cell stack 56. In this example, the first and second friction plates 84, 86 contact a respective one of the first and second support plates 68, 70. Further, the first friction plate 84 is mounted to the sensor support plate 82 and directly contacts the force sensor 78, while the second friction plate 86 is directly mounted to the second end plate 76.

The first and second friction plates 84, 86 are made of a material having a relatively low coefficient of friction, such as a polymer or ceramic material, thereby allowing the cell stack 56 to move relative to the compression rig 72 in directions substantially perpendicular to the compressive force $F_C$. This disclosure is not limited to any particular material type for the first and second friction plates 84, 86. Further, the first and second friction plates 84, 86 are not required in all examples.

While fasteners—in particular, screws—are shown connecting the various plates 72, 76, 82, 86 in the figures, it should be understood that alternate connection techniques come within the scope of this disclosure. Further, it should be understood that the first end plate 72, sensor support plate 82, and the second friction plate 86 may be integrated and provided by a single component. Likewise, the second end plate 76 and the second friction plate 86 may be integrated and provided by a single component.

Figure 4:
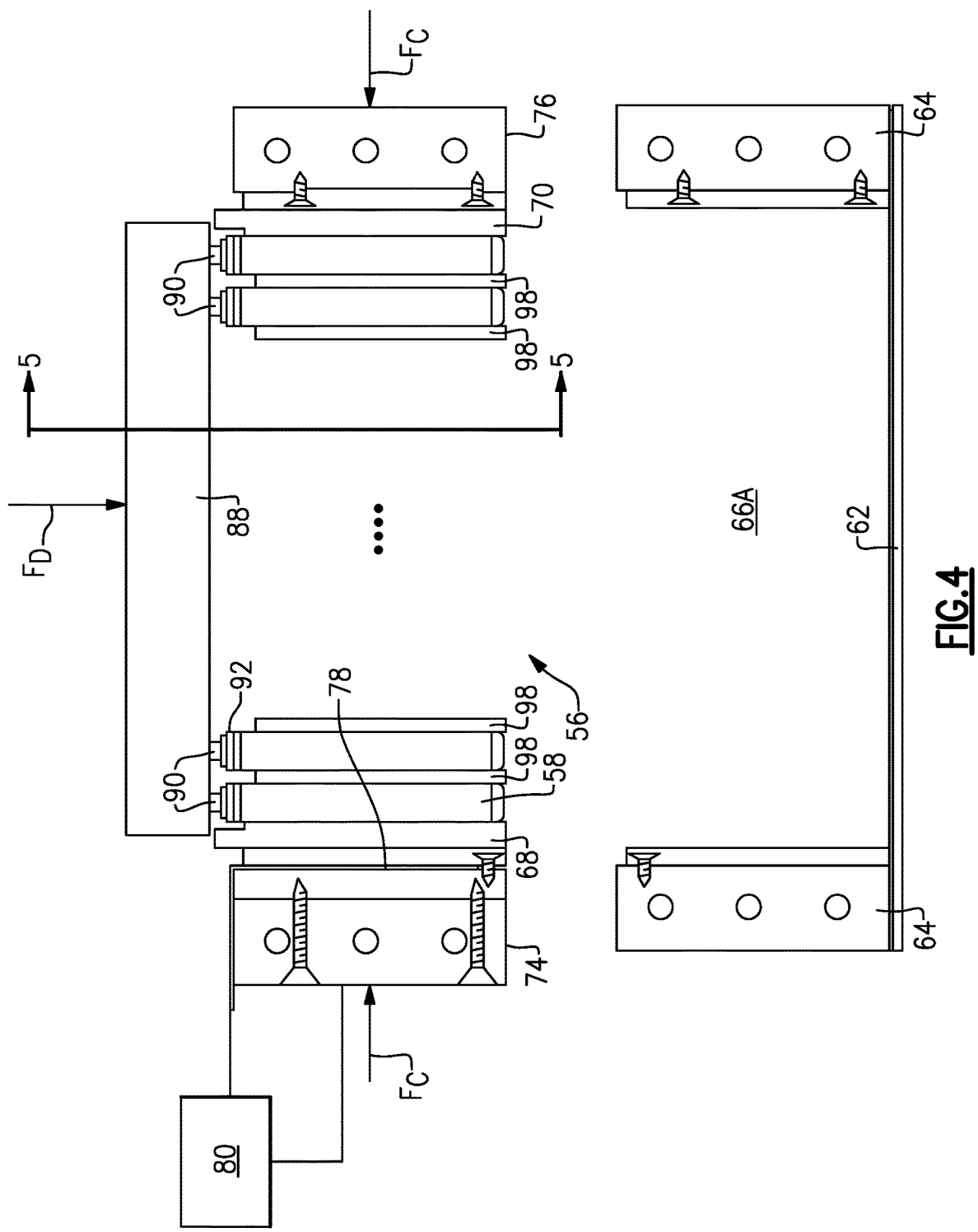
FIG. 4 is a side view of the compression rig adjacent the structural assembly.

FIG. 4 illustrates a plunger 88 arranged above (relative to the orientation of FIG. 4) the cell stack 56. The plunger 88 is a structure configured to apply the downward force $F_D$ on the first and second support plates 68, 70 to insert the cell stack 56 into the pocket 66A. In general, the cell stack 56 would not fit within the pocket 66A without the compressive force $F_C$. Thus, the downward force $F_D$ is applied while the compressive force $F_C$ is applied. Further, when inserted into the pocket 66A, the side walls 64 continue to apply a compressive force on the cell stack 56, which may be different than the compressive force applied by the compression rig 72.

Figure 5:
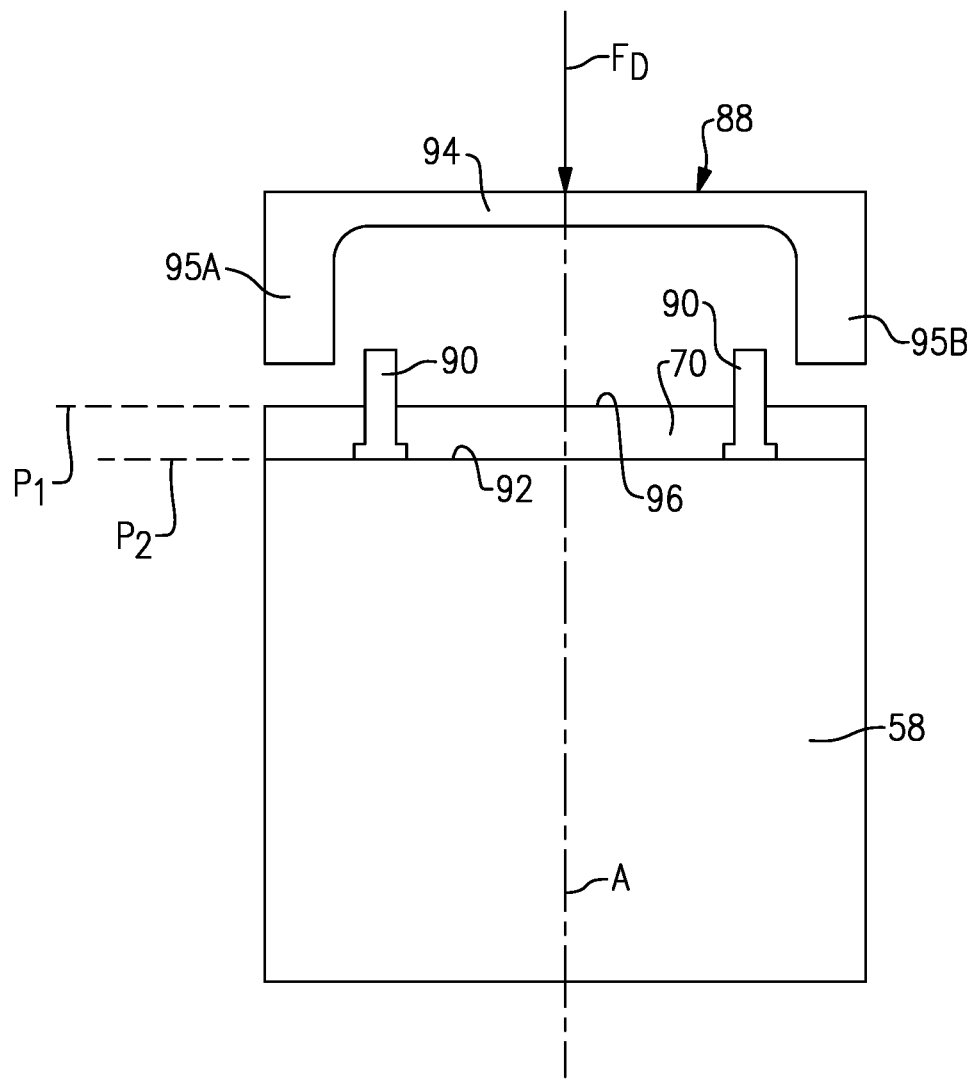
FIG. 5 is a view taken along line 5-5 from FIG. 4, and illustrates an example arrangement between the cell stack and a plunger.

The plunger 88 is arranged such that it contacts the first and second support plates 68, 70 without contacting any of the cells 58, and specifically without contacting any terminals 90 which, in this example, project upward from an upper surface 92 of the cells 58. In FIG. 5, which shows one cell 58, the cell 58 includes two terminals 90 adjacent opposite sides thereof. As shown in FIG. 5, which is a view taken along line 5-5 from FIG. 4, the plunger 88 is arranged in generally an upside-down "U" shape so as to avoid contacting any portion of the cells 58, including the terminals 90.

The plunger 88, in this example, is centered along an axis A, which is a centerline of the cell 58. The plunger 88 includes a main body 94, and first and second arms 95A, 95B projecting downward from opposed lateral sides of the main body 94. The first and second arms 95A, 95B are configured to contact the uppermost surface 96 of the second support plate 70 at locations laterally outward (i.e., away from the axis A) of the terminals 90. In this way, the plunger 88 transmits the downward force $F_D$ to the first and second support plates 68, 70.

The uppermost surface 96 of the second support plate 70 lies in a plane $P_1$ spaced-apart from a plane $P_2$ of the upper surface 92 of the cell 58. In particular, the plane $P_1$ is spaced-apart above the plane $P_2$ because the second support plate 70 has a height dimension greater than that of the cell 58. While not shown in FIG. 5, the first support plate 68 is arranged in the same way as the support plate 70, with its upper surface lying in a plane co-planar with the plane $P_1$. Thus, the plunger 88 contacts the first and second support plates 68, 70, and does not contact the cells 58. While the arrangement between the plunger 88 and the first and second support plates 68, 70 has distinct advantages, this disclosure extends to arrangements wherein the plunger 88 contacts the cells directly. In those examples, the cells 58 may be adapted and arranged to be resistant to the force applied by the plunger 88.

With reference back to FIG. 4, at this stage of the assembly, the cell stack 56 is unbound. In other examples, the cell stack 56 may include mechanical fasteners providing a binding between the cells 58. The cell stack 56 may include spacers 98, which may be plastic sheets, between each individual cell 58. In general, however, the cell stack 56 is held together by the compressive force $F_C$.

In one example method, the controller 80 issues a command to the first and/or second end plates 74, 76 to apply the compressive force $F_C$ to the cell stack 56. Based on signals from the force sensor 78, the controller 80 may adjust the compressive force $F_C$ until the cell stack 56 is compressed to the point where the cell stack 56 has a length dimension that fits within the pocket 66A. When sufficient compression has been achieved, the controller 80 issues a command to the plunger 88 to apply the downward force $F_D$. As the downward force $F_D$ is applied, the cell stack 56 begins to move out of the compression rig 72 and toward the pocket 66A.

Figure 6:
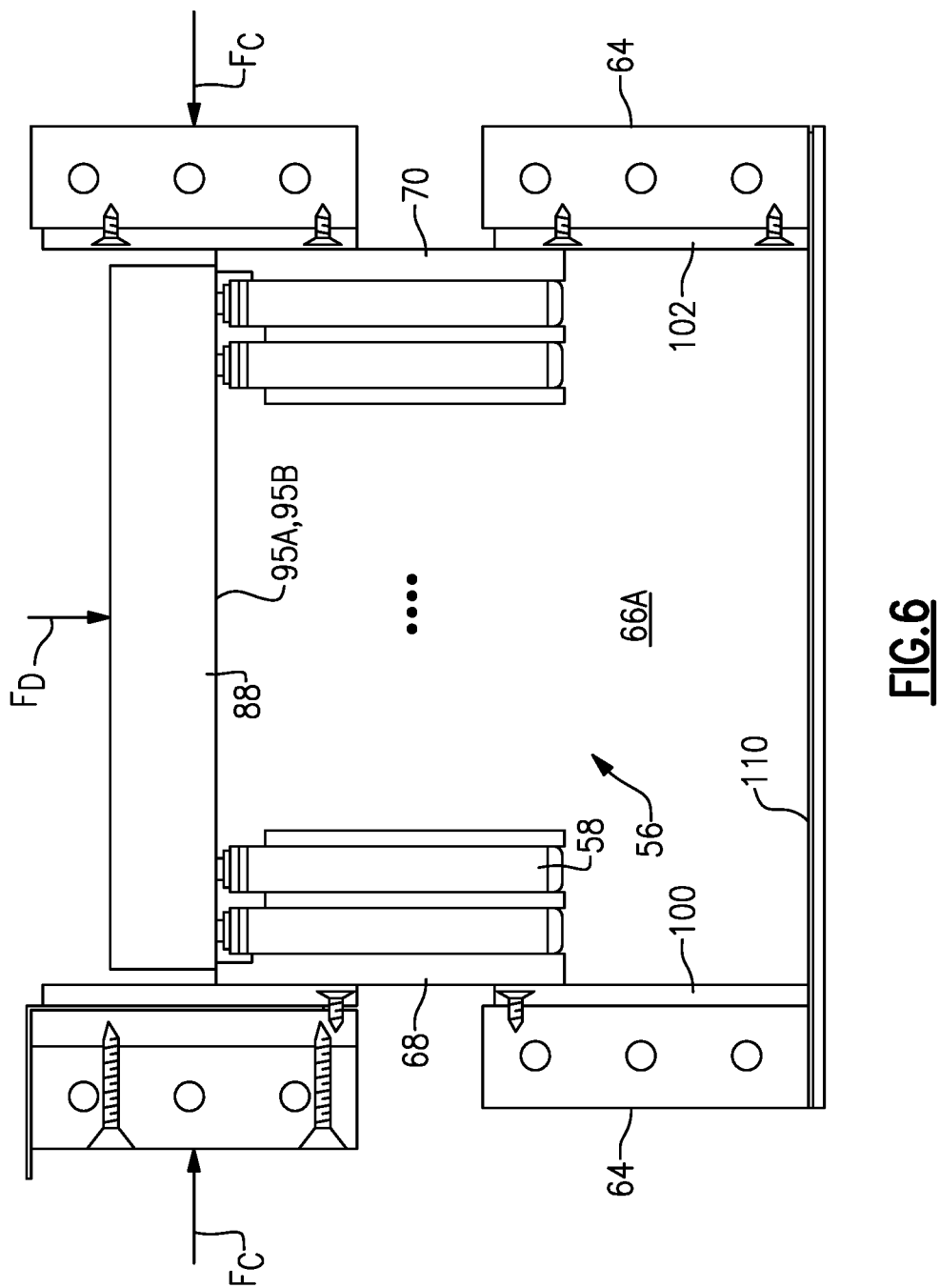
FIG. 6 is a side view of the compression rig adjacent the structural assembly.

FIG. 6 illustrates the cell stack 56 partially inserted into the pocket 66A. In FIG. 6, the first and second arms 95A, 95B of the plunger 88 contact the upper surfaces of the first and second support plates 68, 70, and the plunger 88 does not contact any of the cells 58. Further, in FIG. 6, the compressive force $F_C$ is still applied to the cell stack 56. In the example of FIG. 6, the side walls 64 of the pocket 66A are fit with friction plates 100, 102, which function like the friction plates 84, 86 of the compression rig 72, and serve to increase the ease with which the cell stack 56 is inserted into the pocket 66A. The friction plates 100, 102 are not required in all examples, however.

The plunger 88 continues to apply the downward force $F_D$ until the cell stack 56 is fully inserted into the pocket 66A, as shown in FIG. 7. It should be noted that the downward force $F_D$ may be variable. In particular, the downward force $F_D$ may vary based on the time and depth of the movement of the plunger 88. In other examples, however, the downward force $F_D$ may be generally constant.

In FIG. 7, the controller 80 issues commands to stop the compressive and downward forces $F_C$, $F_D$. The controller 80 may be in communication with one or more sensors 110 adjacent the pocket 66A that generates a signal indicative of the downward force $F_D$ and is used by the controller 80 to avoid applying excessive downward force on the cells. The sensor 110 is not required in all examples, however. The plunger 88 is retracted, and the process repeats for additional cell stacks. For example, the process repeats for a cell stack that may be inserted into the pocket 66B or any other pockets.

The battery assemblies described by this disclosure provide compact designs that leave near zero air spaces inside the assembly. This improves system density and reduces the amount of air available to expand/contract inside the assembly. Furthermore, the exemplary battery assemblies provide a packaging solution that reduces the number and size of packaging components, substantially eliminates conventional array retention components, and substantially eliminates threaded fastener connections. And, as mentioned above, this disclosure allows one to insert a cell stack into a structural assembly without damaging the battery cells.

It should be understood that terms such as "downward," "upper," etc., are directional terms made with reference to the normal operational attitude of the components being described. These directional terms are used for purposes of explanation only, and should not otherwise be considered to be limiting. Further, terms such as "about," "substantially," and "generally" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A method, comprising:
   compressing a cell stack, the cell stack including at least one battery cell and a support plate spaced-apart from an upper surface of the at least one battery cell; and
   inserting the cell stack into a pocket of a structural assembly by applying a force directly to the support plate and without applying the force directly to the at least one battery cell.

2. The method as recited in claim 1, wherein the inserting step includes using a plunger to apply the force to the support plate.

3. The method as recited in claim 2, wherein the inserting step includes pressing the plunger against the support plate.

4. The method as recited in claim 2, wherein:
   the support plate is a first support plate,
   the cell stack includes a second support plate,
   the first and second support plates are arranged on opposite ends of the cell stack, and
   the inserting step includes using the plunger to apply a force to the first support plate and the second support plate.

5. The method as recited in claim 4, wherein:
   the at least one battery cell includes terminals projecting from a surface the at least one battery cell, and
   the inserting step includes using the plunger to apply the force to the support plate without the plunger contacting the terminals.

6. A method, comprising:
   compressing a cell stack, the cell stack including at least one battery cell and a support plate spaced-apart from an upper surface of the at least one battery cell; and
   inserting the cell stack into a pocket of a structural assembly by applying a force to the support plate,
   wherein the inserting step includes using a plunger to apply the force to the support plate,
   wherein the support plate is a first support plate,
   wherein the cell stack includes a second support plate,
   wherein the first and second support plates are arranged on opposite ends of the cell stack,
   wherein the inserting step includes using the plunger to apply a force to the first support plate and the second support plate,
   wherein the at least one battery cell includes terminals projecting from a surface the at least one battery cell,
   wherein the inserting step includes using the plunger to apply the force to the support plate without the plunger contacting the terminals,
   wherein the at least one battery cell includes two terminals spaced-apart from one another, and
   wherein the plunger includes first and second arms arranged laterally outboard of the terminals, the first and second arms configured to contact the first and second support plates.

7. The method as recited in claim 1, wherein the cell stack is compressed by a compression rig including a first end plate arranged adjacent a first end of the cell stack and a second end plate arranged adjacent a second end of the cell stack.

8. The method as recited in claim 7, wherein the compression rig applies a compressive force on the cell stack before and during the inserting step.

9. The method as recited in claim 7, wherein:
   the compression rig includes a first friction plate between the first end plate and the first end of the cell stack, and
   the compression rig includes a second friction plate between the second end plate and the second end of the cell stack.

10. The method as recited in claim 9, wherein:
    the compression rig includes a force sensor configured to generate a signal indicative of the compressive force applied to the cell stack by the first and second end plates.

11. A method, comprising:
    compressing a cell stack, the cell stack including at least one battery cell and a support plate spaced-apart from an upper surface of the at least one battery cell; and
    inserting the cell stack into a pocket of a structural assembly by applying a force to the support plate,
    wherein the cell stack is compressed by a compression rig including a first end plate arranged adjacent a first end of the cell stack and a second end plate arranged adjacent a second end of the cell stack,
    wherein the compression rig includes a first friction plate between the first end plate and the first end of the cell stack,
    wherein the compression rig includes a second friction plate between the second end plate and the second end of the cell stack,
    wherein the compression rig includes a force sensor configured to generate a signal indicative of the compressive force applied to the cell stack by the first and second end plates,
    the compression rig includes a sensor support sheet arranged between the first friction plate and the first end plate, and
    the sensor support sheet supports the force sensor.

12. The method as recited in claim 1, wherein the cell stack includes a plurality of battery cells.

* * * * *